US00RE35077E

United States Patent [19]

Allina

[11] E Patent Number: Re. 35,077

[45] Reissued Date of Patent: Oct. 31, 1995

[54] ELECTRICAL TRANSIENT SURGE PROTECTION

[76] Inventor: Edward Allina, 605 Capri Blvd., Treasure Island, Fla. 33706

[21] Appl. No.: 800,086

[22] Filed: Nov. 29, 1991

Related U.S. Patent Documents

Reissue of:

[64] Patent No.: 4,931,895
Issued: Jun. 5, 1990
Appl. No.: 923,524
Filed: Oct. 28, 1986

[51] Int. Cl.[6] ..... H02H 9/04

[52] U.S. Cl. ..... 361/56; 361/91; 361/111; 361/127

[58] Field of Search ..... 361/56, 58, 62, 361/91, 104, 118, 111, 127, 367, 366, 376, 374, 661, 668; 307/39, 116, 125, 130

[56] References Cited

U.S. PATENT DOCUMENTS

| | | | |
|---|---|---|---|
| 1,778,972 | 10/1930 | Frank | 361/366 X |
| 2,606,232 | 8/1952 | St. John | 361/366 |
| 3,693,053 | 9/1972 | Anderson | 361/56 |
| 3,725,745 | 4/1973 | Zisa | 361/56 |
| 3,742,420 | 6/1973 | Harnden, Jr. | 338/21 |
| 3,894,274 | 7/1975 | Rosenberry, Jr. | 361/56 X |
| 3,914,657 | 10/1975 | Melanson | 361/56 |
| 4,218,721 | 8/1980 | Stetson | 361/117 |
| 4,249,224 | 2/1981 | Baumbach | 361/124 |
| 4,262,319 | 4/1981 | Perry et al. | 361/127 |
| 4,645,943 | 2/1987 | Smith, Jr. et al. | 361/401 |
| 4,661,881 | 4/1987 | Watson et al. | 361/104 |
| 4,791,523 | 12/1988 | Pick et al. | 361/104 |
| 5,023,747 | 6/1991 | Lindsay | 361/117 |

OTHER PUBLICATIONS

Wark, Kenneth, *Thermodynamics,* Copyright 1977, 3rd Edition pp. 242–243.

*Primary Examiner*—Todd E. DeBoer

[57] ABSTRACT

An adapter to be plugged in between a conventional watt-hour meter and an electrical power use installation socket to protect both the meter and downstream equipment from possible damage by transient surges in electrical potential resulting from lightning or similar disturbance. For the usual meter having a pair of power input terminals and a pair of power output terminals, this adapter has a pair of varistors or similar non-linear resistances connected between the respective input terminals and ground, so as to conduct away such surges. It also preferably has a heat sink connected to the grounded side of the varistors to dissipate the thermal energy resulting from the surge conduction. Additional features include an indicator of operating condition and fuse links to the varistors.

13 Claims, 2 Drawing Sheets

ELECTRICAL TRANSIENT SURGE PROTECTION

Matter enclosed in heavy brackets [ ] appears in the original patent but forms no part of this reissue specification; matter printed in italics indicates the additions made by reissue.

BACKGROUND OF THE INVENTION

This invention relates to protection of electrical equipment from transient surges in voltage, as from an external power source, especially by means of protective apparatus interposable between a conventional watt-hour meter and electrical loads downstream.

The desirability of protecting electrical meters and related equipment from voltage surges is well known. Similarly known are devices whose resistance varies non-linearly under applied voltage so that conduction therethrough is disproportionately greater at higher voltages than at normal lower voltages. A name for a class of such devices is "varistor".

Varistors connected to provide such surge protection have been installed within meters, as in Melanson U.S. Pat. No. 3,914,657 and in Zisa U.S. Pat. No. 3,725,745; and also in devices of plug-and-jack type adapted for use between electrical outlets and appliances to be operated by electricity drawn from such outlets, as in Orfano U.S. Pat. No. 4,089,032. Plug-and-jack devices for use between such an electric meter and the premises of an electricity customer include circuit-interrupting means (switches, with or without associated fuses), as suggested by Megarian in U.S. Pat. No. 3,599,047 and by St. John in U.S. Pat. No. 2,606,232. Interposition of a varistor or similar non-linear resistor between such a meter and downstream equipment at a customer's location is less apparent, notwithstanding that a need exists for a simple effective way to provide surge protection.

SUMMARY OF THE INVENTION

In general, the objects of the present invention are attained by shunting transient surges in electrical power to ground before watt-hour meters and downstream loads are affected thereby. More particularly, this invention provides plug-and-jack means to adapt surge protection to conventional plug-in meter installations, in such a manner as to minimize the effects of such transient surges upon the protective means as well as upon the items so protected.

A primary object of the present invention is to enable meters of conventional electromechanical or all electronic watt-hour type to be protected from transient surge damage without modification of such a meter or of its conventional socket at a customer's location.

Another object of this invention is to utilize varistors or similar devices, in coping with transient surges, more effectively and reliably than heretofore, not only to protect such meters but also to protect power customers' electrical equipment downstream.

A further object is to provide such protection in proximity to external grounding means so as to enhance surge protection benefits.

Still another object of this invention is to provide visible indication of the condition of the surge protection equipment.

Yet a further object of the invention is to provide apparatus and methods for so protecting such meters readily and economically.

Other objects of the present invention, together with means and methods for attaining the various objects, will be apparent from the following description and the accompanying diagrams of a specific embodiment, being presented by way of example rather than limitation.

DETAILED DESCRIPTION

Figure 1:
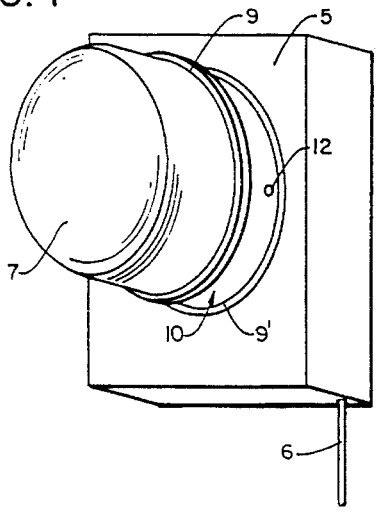
FIG. 1 is a perspective view of surge-protection adapter means of the present invention in normal use, between a watt-hour meter and usual meter-receiving means in a utility box, as installed on the premises of a customer whose use of electrical power is metered.

FIG. 1 shows, in perspective, generally rectangular electrical utility box 5, which has grounding cable or rod 6 extending downward from one bottom corner. Forward and leftmost of the box is meter 7 of conventional watt-hour type, with a dome-like transparent cover extending to the left (contents not shown here). As is customary, abutting components of the assembly are retained together by a split ring adapted to surround end flanges on the respective components. As is so well known as to require no illustration here, such type of retainer ring is flexible and has a slotted part and a laminar part adapted to protrude through the slot when the ring is put in place. An opening through the protruding laminar part receives a wire that is then surrounded by a lead seal or similar means to discourage or to reveal unauthorized disconnection or tampering with the assembly.

Figure 2:
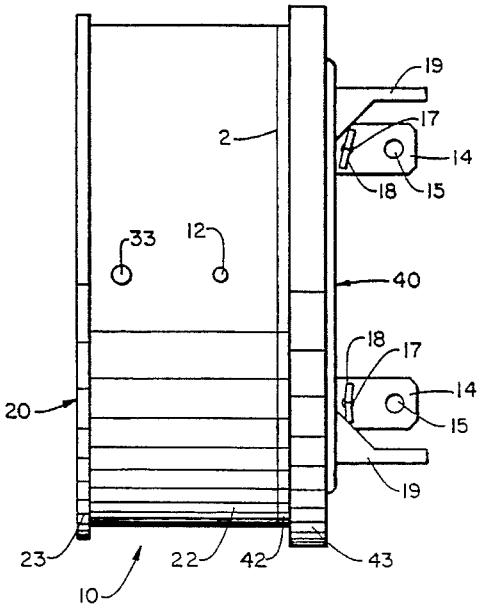
FIG. 2 is a right side elevation of the adapter means partially visible in FIG. 1, disassembled from other apparatus shown there.

FIG. 2 shows, in right side elevation, adapter means 10 of this invention disassembled from the meter and utility box of FIG. 1 and on an enlarged scale. The adapter comprises two principal members (joined together here along vertical junction line 2): open-ended cylindrical housing 20 at the left, and shallower cover plate 40 at the right. The housing member has sidewall 22, surrounded at its open (left) end by flange 23. Visible in the housing, just left of the separation line and midway from top to bottom, is condition light 12 connected (as shown later) to indicate an operative or ready condition when lit and an unready or out-of-order condition when not lit. Further left is fastener 33, discussed further below.

Protruding to the right of the cover plate are plug terminals 14 of spade type (two of four are visible), each with opening 15 near its free end and with smaller opening 17 nearer the plate and with retaining cotter pin 18 therethrough. Above and below (partly surrounding and partly hidden beyond) the spade terminals are feet 19, one visible per connector, protruding a bit farther than the terminals. It will be apparent from later views that there are two pairs of such terminals; conventionally the upper pair are for power input to the meter, and the lower pair for power out to a customer's installation and electrically powered equipment downstream.

Figure 3:
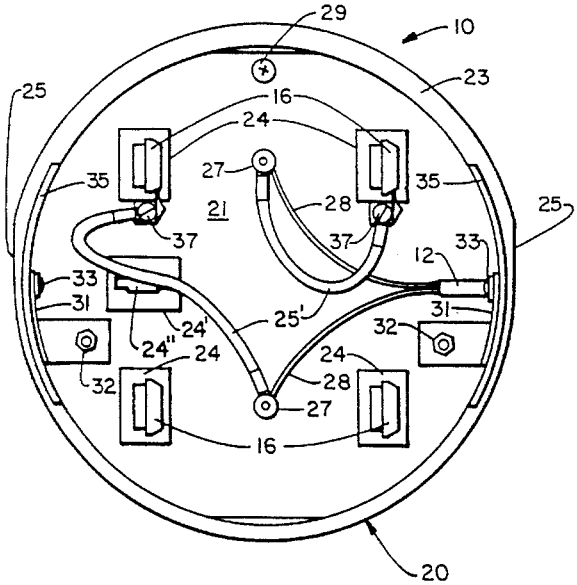
FIG. 3 is a front elevation of the same adapter means.

FIG. 3 shows, in front elevation, the open end of housing member 20 of adapter means 10, which has base 21 closing one end of cylindrical sidewall 22. Generally circular edge flange 23 at the open end has a pair of flat portions 25 at its opposite sides. Four rectangular bosses 24 rise from the base of the housing, in a nearly square layout, each with one of the previously shown space terminals inserted into and through a close-fitting vertical slot (numbered). Jaws 16 of the jack end of such terminals protrude toward the viewer from the tops of the bosses. Fifth boss 24' similar to the other but oriented with slot 24" therein horizontal instead of vertical is located between the left upper and lower bosses 24—for alternative future use, not used by the present invention.

Fasteners shown in FIG. 3 and subsequent views are illustrative rather than limitative. Usually (but not always) the same reference numeral denotes all parts of any given fastener, whether alike or different, as at opposite ends. Pair of fuse links [25] *25'* connect between pair of fasteners 37 at the top pair of terminals to pair of fasteners 27 located laterally midway between the top and bottom pairs of bosses, respectively. Condition light 12 (partly hidden in a right sidewall opening) has pair 28 of leads also extending to fasteners 27. Shown between the light and the viewer is one of pair of ground straps 31, secured to fasteners 32 (one each) in the base and also to fasteners 33 (one each) in the sidewall of the housing. The respective straps are attached by the last mentioned fasteners to grounding collars 35, extending along minor lengths of the edge of the housing sidewall. Located above upper fastener 27 is fastener 29 to aid in retaining cover plate 40 onto the outside of the housing base.

Figure 4:
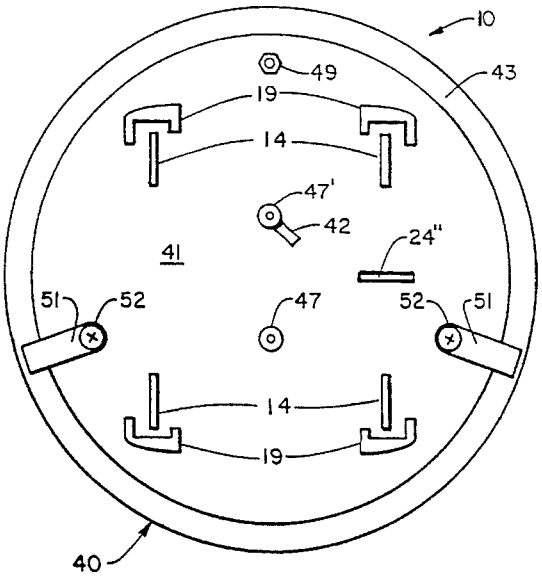
FIG. 4 is a rear elevation of the same adapter means.

FIG. 4 shows adapter means 10 in rear elevation, notably cover plate 40 and specifically the outside face of its plate 41 and edge of its surrounding flange 43. Shown symmetrically arranged in the same pattern as jaws of the terminals in FIG. 3 are spade ends 14 thereof. Partly surrounding the outer edges of the terminals are feet 19, here seen end-on. On the vertical midline (not marked) are pair of fasteners 47, 47' located a short distance below and above the horizontal midline (also not marked). Auxiliary pigtail ground connector 42 is part of the upper fastener. Above it is opposite end 49 of fastener 29 extending from the housing base, shown in FIG. 3. Slanting downward at both the right and left side, from the ends of screw fasteners 52 (one each) in the plate near the edge of the flange, are pair of grounding strips 51 partly overlying that edge.

Figure 5:
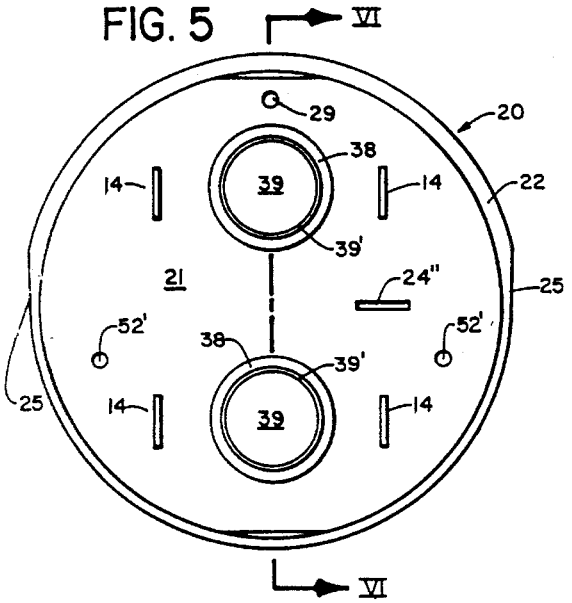
FIG. 5 is a rear elevation of a housing member portion of the same adapter means, whose front elevation was shown in FIG. 3, here shown disassembled from a cover plate portion thereof.

FIG. 5 shows, in rear elevation, housing base 21 of adapter means 10, whose front elevation appeared in FIG. 3. Upper and lower bores 29 appear as before. Space terminals 14 protrude toward the viewer through corresponding slots (not visible) in the rectangular array shown previously. Unused horizontal slot 24" also appears. Midway between the respective upper and lower pairs of terminals are pair of shallow cup-shaped non-conductive holders 38 for disk-shaped varistors 39 (one each). Each varistor has non-conductive collar 39' surrounding it. Right and left flats 25 on housing flange 23 appear as before. A vertical section line is superimposed to indicate the nature of the next view.

Figure 6:
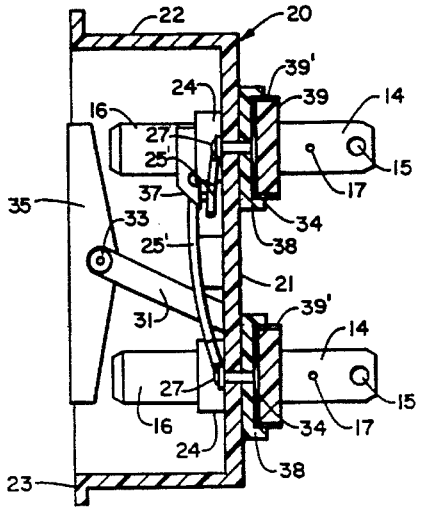
FIG. 6 is a vertical section through such adapter housing, taken at VI—VI on FIG. 5.

FIG. 6 shows a vertical section through the housing member of the adapter means, at VI—VI on FIG. 5, corresponding to a leftward looking vertical section of the housing member of the adapter shown from the front in FIG. 3. Partial collar 35 is seen, in more detail than previously, along part of the edge of flange 23 and sidewall 22 and connected by fastener 33 to grounding strap 31, which terminates along the housing base as shown further in FIG. 3. One fuse link 25 is connected between fastener 37 at the upper terminal to fastener 27 located nearer the viewer than the lower terminal and surrounding boss. The other fuse link is shown (fragmentarily) connected to the corresponding fastener ahead of the upper terminal boss. The other end of each such fastener is suitably attached to one of a pair of conductive lamina 34, circular in outline, contiguous with one face of one of varistors 39, each in adjacent cup-shaped holder 38. The laminar cross-section shows a recessed central part, surrounding the head of the fastener, and a flatter annular part therearound and in actual contact with the conductive varistor face. Of course, the varistors and holders are nearer the viewer than spade terminals 14 shown extending to the right from locations behind them. Contactors (one each) for the opposite face of each varistor are carried by the cover member, as shown in the next pair of views.

Figure 7:
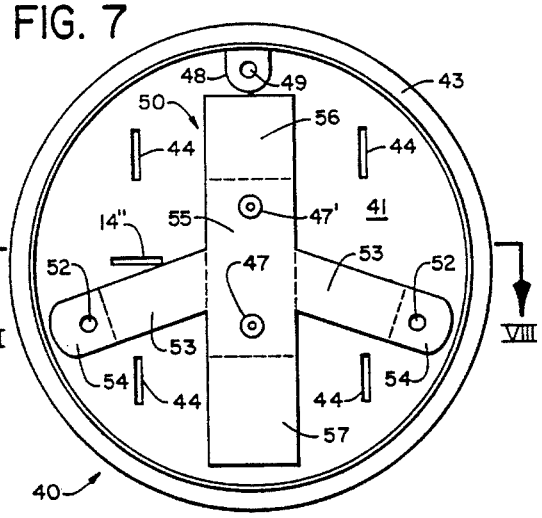
FIG. 7 is a front elevation of the cover plate member of such adapter means, whose rear elevation was shown in FIG. 4, here shown disassembled from the base of the housing member thereof.

FIG. 7 shows, in front elevation, cover plate 40, whose rear elevation was shown in FIG. 4. Bore 49 near the top center, just below the inner edge of flange 43, is surrounded by boss 48. Slots 44 for spade terminals 14 (not present in this view) are visible as before. The most prominent feature here is electrically conductive cruciform member 50, which has a wide body portion, extending from just below boss 48 to near the bottom inside edge of flange 4,3, and narrower arm portions extending therefrom. Central rectangular part 55 of the body portion adjoins upper and lower body parts 56 and 57, each of which rises toward the viewer and is sufficient springy to provide excellent electrical contact with the underlying varistors when the cover plate is assembled to the adapter housing base. Pair of integrally formed arms extend outward and slant downward from the opposite sides of the central part of the body member. Each arm has terminal part 54, overlying boss 58 and secured by screw fastener 52 through an opening therein, interconnected to the body by inclined intermediate part 53 (separately designated here because of planar differences visible in the next view).

Figure 8:
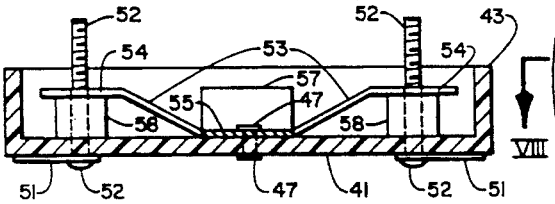
FIG. 8 is a horizontal section through such adapter cover plate, taken at VIII—VIII on FIG. 7.

FIG. 8 shows cover plate 40 sectioned horizontally and viewed downward, as indicated at VIII—VIII in FIG. 7. Bosses 58 (through which screw fasteners 52 pass) underlie respective end portions 54 of cruciform member 50, raising them out of the plane of the central part of body portion 55 thereof, which is secured against the inner face of the cover plate by a pair of fasteners (see FIG. 4). Outer end of only the lower one of such conducting ends can be seen here. Intermediate portions 53 of the arms slant upward from junction with the body to junction with respective end portions 54 of member 50. Lower part 57 of the body portion of the cruciform member shown in FIG. 7 is visible rising from the plane of that part so secured.

Figure 9:
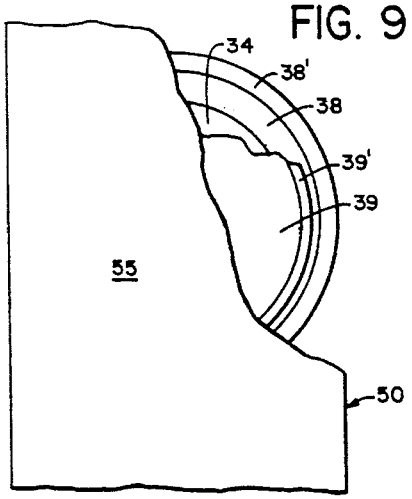
FIG. 9 is a cut-away detail view of part of such apparatus.

FIG. 9 shows, on an enlarged scale and successively cut away, portions of the apparatus of this invention shown in somewhat less detail in prior views. Shown closest to the viewer is part of the body portion of electrically conductive member 50, cut away to show some of the underlying components, including next underneath and in contact with it one face of varistor 39, which has insulating collar 39' around it. Surrounding the varistor is upturned edge 38' of non-conductive cuplike holder 38, which does not reach overlying conductive member 50. The varistor and its surrounding collar are cut away to reveal conductive lamina 34, which is in contact with the underlying opposite face of the varistor, and incidentally to show more of the base of the cuplike holder as well. This view is included because of the operational importance of the electrical circuitry represented by the visible components, whose functioning is considered in some detail below, where it is noted that member 50 is not only an excellent conductor of electricity but also of heat.

Operation of the apparatus of this invention will be readily understood. In the event of an electrical transient that exceeds the usual power voltage sufficiently to pose an equipment hazard, i.e., a "surge", it appears across the power input terminals (the top pair) and is conducted by the fuse links to the varistors. In a very short time, varistor conductor occurs and bleeds the surge harmlessly off to ground via the intervening conductive elements. It will be understood that a path is provided to the grounding rod or cable via cooperating conductors (not shown) with which contact is made upon assembling the adapter means to the electrical utility box (into whose socket the meter usually is plugged, in the absence of the adapter means of this invention).

Perhaps not so apparent is the fact that the current flow in a tightening-induced surge, even for only a few microseconds to a milli-second or so, may result in a current density of hundreds or even thousands of amperes per square centimeter. Despite the low resistance of the path followed within the adapter, the resulting heat to be dissipated may be appreciable. To limit increase in "watts loss" via the varistors, which conduct even more readily at increased temperature, the immediate conductor (50) on the grounded side of the varistors functions as a heat sink as well as a current conductor. The heat sink also reduces the possibility of flashover, shorting, or other damage to the varistors. A thickness of at least about a millimeter or so over much of the surface area of the cover plate conveniently gives the heat sink enough mass to absorb a very considerable amount of thermal energy without excessive temperature rise. The heat-sinking action enables the adapter—and the meter protected by it—to withstand repeated lightning surges or similar intermittent disturbances without failure or damage to the varistors or other parts.

The heat sink conveniently is made up of a metal having high electrical conductivity, thermal conductivity, and heat capacity. Copper is preferred, but aluminum (which will occupy several times as much space as an equivalent mass of copper) is also suitable. A coupled grams of either will take up several joules (about a dozen calories) of heat energy for each degree of rise in temperature. If the higher cost is acceptable, silver—not to mention gold—is an excellent choice.

Surge-generated heat collected in large part by the heat sink is subsequently conveyed away—usually mostly by conduction, partly by convection, and even less by radiation—to the environment. A multiplicity of such surges can be accommodated while increasing the temperature of a suitable heat sink only relatively few degrees, whereas collection of the equivalent amount of heat energy by the varistors or by sensitive meter parts risks adverse effects upon them or their functioning.

In the event of a more sustained surge, as from some fault in power generation or transmission, resultant melting of one of the fuse links soon disconnects the power from the indicator light, a gas-filled (e.g., neon) glow lamp or a light-emitting diode, for example. Observation that the light is out prompts inspection and temporary replacement of the unit for inspection and testing, to be followed by whatever maintenance may prove necessary.

The varistors themselves, which comprise chiefly sintered metal compositions, such a zinc oxide or silicon carbide, together with lesser amounts of other important materials, are quite rugged and can stand a good deal of electrical abuse. They are articles of commerce and can be obtained in a wide range of voltage and current capacities through electrical equipment manufacturers or dealers.

The other components of the adapter apparatus of this invention are also readily available in ordinary trade channels. The housing and cover members may be adapted from standard articles or may be redesigned specifically for this purpose. They are composed of common non-conductive plastic materials, with or without reinforcing additives. Glass-fiber reinforced polyester and ABS are examples of the many suitable compositions available.

Advantages of using the surge-protective adapter apparatus of this invention have been mentioned above, and others will be readily apparent. A watt-hour meter already in use can be protected simply by unplugging it and plugging the adapter in its place, and then plugging the meter into the adapter. Existing meter designs do not have to be redesigned at considerable expense and possible delay in availability to incorporate varistors or equivalent protective means because the adapter renders such redesign unnecessary.

Electrical power customers benefit because the protection also protects their appliances, computers, radio or television receivers, and other sensitive loads from the same surges. Such protection is as worthwhile for their equipment as it is for the power company's meters. Providing such protection will benefit the power company indirectly as well as directly.

Although the foregoing description and accompanying diagrams features a specific embodiment, modifications or variants have been suggested, and others will come readily to mind. If desired, spark gaps or high-power diodes may be inserted in conjunction with the varistor to eliminate current conduction at power voltages. More complex but otherwise equivalent adapter apparatus may be provided for multiphase power operations by extending these principles of design and operation, as will be apparent to persons skilled in the related arts after having been made aware of the present disclosure.

Other variations may be made, as by adding, combining, deleting, or subdividing parts or steps, while retaining at least some of the advantages and benefits of the invention, which itself is defined in the following claims.

I claim:

1. Adapter means used in retrofitting electrical utility watt-hour meters with protection against surge damage from lightning or other transient source, comprising a housing member provided with power input and power output terminals, adapted to plug into external socket means into which such a meter normally plugs;

socket terminals into which such a meter is likewise equipped to plug, connected respectively to the plug terminals;

varistor means connected between at least one such power input terminal and external grounding means, and;

electrically and thermally conductive heat-sink means connected between and to the varistor means and the grounding means.

2. Meter adapter means according to claim 1, including a plurality of such power input terminals, and a like plurality of varistors connected to such respective power input terminals.

3. Meter adapter means according to claim 2, wherein the heat-sink means is substantially cruciform in outline, the varistors are in electrical and thermal contact with arms of the cross, and the body of the cross is connected to a conductor to ground.

4. Adapter means used in protecting electrical utility watt-hour meters having a pair of power input terminals and a pair of power output terminals against electrical surge damage from lighting or other transient source, the adapter means being insertable between such meter terminals and conventional socket means therefor at a user's installation, and the adapter means comprising an open-ended non-conductive housing member having a base, a pair of power input and a pair of power output terminals, each adapter terminal having a female end within the open end of the housing and adapted to receive a terminal of such a meter, each adapter terminal having a male end protruding beyond the housing base and adapted to plug into such socket means;

varistor means supported by the housing, electrically connected at one face to the pair of power input terminals via a first path, and electrically connected at the opposite face to an available external ground connection via a second path; and hut-sink means in electrically and thermally conductive contact with the varistors via such second path.

5. Meter adapter means according to claim 4, wherein such heat-sink means is attached to the cover plate and is spring-biased against a conductive face of the varistor means.

6. Adapter means for protecting electrical utility watt-hour meters having a pair of power input terminals and a pair of power output terminals against electrical surge damage from lightning or other transient source, the adapter means being insertable between such meter terminals and conventional socket means therefor at a user's installation, and the adapter means comprising an open-ended non-conductive housing member having a base, a cover plate for the closed end of the housing base, and means for removably retaining the cover over such end, a pair of power input and a pair of power output terminals, each adapter terminal having a female end within the open end of the housing and adapted to receive a terminal of such meter, each adapter terminal having a male end protruding beyond the housing base and adapted to plug into such socket means; and varistor means supported by the housing between the base and the cover and being electrically connected at one face to the pair of power input terminals via a first path, and electrically connected at the opposite face to an available external ground connection via a second path;

cuplike means partially enclosing the varistor means;

and separate conductive laminar means in the first and second paths, respectively, in conductive contact with the respective faces of the varistor means.

7. In adapter means adapted to plug into a socket such as a utility meter customarily plugs into and further adapted to receive an electrical utility meter plugged in like manner into such adapter means, the improvement comprising a generally cylindrical non-conductive adapter housing having therein the following:

conductive electrical transient over-voltage means, adjacent heat-sink means in electrically and thermally conductive relationship to such over-voltage means, and means mounting such over-voltage means in electrically [and thermally] non-conductive relationship with adjacent conductive means.

*8. Adapter means for retrofitting electrical utility watt-hour meters with protection against surge damage from lightning or other transient source, comprising*

*a housing member having an edge flange and being provided with*

*power input and power output terminals, adapted to plug into socket means of a meter mounting utility box into which such a meter normally plugs;*

*socket terminals, into which such a meter is likewise equipped to plug, connected respectively to the plug terminals; and*

*varistor means connected between at least one such power input terminal and external grounding means via at least one intervening conductive means, wherein the intervening conductive means includes a strip adjacent the edge flange and a fastener extending through the housing member to said strip.*

*9. Adapter means for retrofitting electrical utility watt-hour meters with protection against surge damage from lightning or other transient source, comprising*

*a housing member having an edge flange and being provided with*

*power input and power output terminals, adapted to plug into socket means of a meter mounting utility box into which such a meter normally plugs;*

*socket terminals, into which such a meter is likewise equipped to plug, connected respectively to the plug terminals; and*

*varistor means connected between at least one such power input terminal and external grounding means via at least one intervening conductive means, wherein the intervening conductive means includes a pigtail ground connector extending from the housing member, and a fastener extending through the housing member to said pigtail connector.*

*10. Adapter means adapted to fit in plug-and-jack manner between a watt-hour meter having a plurality of conductive spade terminals extending therefrom and a meter socket having a plurality of conductive jaws adapted to receive meter spade terminals therein and a grounding member, said means comprising*

*a housing means including a base wall and a sidewall extending up from the perimeter of the base wall;*

*a plurality of conductive terminals, each having*

*a spade end extending from inside the housing through slots in the base wall and adapted to fit into the socket jaws, and*

*a jaw end connected to but directed oppositely from the spade end and adapted to receive meter spade terminals therein; and*

*transient voltage suppression means mounted adjacent*

*the base wall and including*

*grounding terminal means extending through the base wall from the inside to the outside of the housing into contact with the grounding member when the meter adapter housing is fitted in plug-and-jack manner between the meter and the socket; and*

*a voltage shunting device conductively connected between at least one of the spade terminals and the grounding terminal means when a voltage surge occurs at said one of the spade terminals.*

*11. Adapter means of claim 10, wherein the grounding terminal means includes a threaded fastener connected in series circuit between the voltage shunting device and a connector to the grounding member when the transient voltage surge suppression means is fitted in plug-and-jack manner between the watt-hour meter and the socket.*

*12. Grounding means, adapted to shunt received transient voltage surges to an external ground from a face of varistor means housed in plug-and-jack meter adapted means having a cylindrical non-conductive housing open at one end and receiving plug terminals of a watt-hour meter and covered at the other end by a base having slots therein and plug terminals extending through the slots and fitting into the jaws of a socket into which meter plug terminals normally fit, comprising fastener means extending from the inside to the outside of the meter adapter housing through the base into connection with adjacent striplike conductive means adapted to be connected to an external ground.*

*13. Grounding means, adapted to shunt received transient voltage surges to an external ground from a face of varistor means comprising a plurality of spaced apart like varistors having a face area housed in plug-and-jack meter adapter means having a cylindrical non-conductive housing receiving plug terminals of a watt-hour meter and having plug terminals extending from an end and fitting into the jaws of a socket into which meter plug terminals usually fit,*

*comprising a conductive member about a millimeter thick, connected between said varistor face and the external ground, and extending over an area of the cylindrical housing interior exceeding said face area, wherein said conductive member is in contact with substantially all of a face of each of said plurality of varistors.*

* * * * *